United States Patent
Poltorak et al.

(10) Patent No.: US 7,658,986 B2
(45) Date of Patent: Feb. 9, 2010

(54) ANODES WITH CORNER AND EDGE MODIFIED DESIGNS

(75) Inventors: Jeffrey Poltorak, Fountain Inn, SC (US); Yongjian Qiu, Greenville, SC (US); Christian Guerrero, Travelers Rest, SC (US); Lance Paul Thornton, Simpsonville, SC (US); Randy S. Hahn, Simpsonville, SC (US); James C. Bates, Jr., Brownsville, TX (US); John Prymak, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 401 days.

(21) Appl. No.: 11/807,765

(22) Filed: May 30, 2007

(65) Prior Publication Data

US 2008/0299371 A1 Dec. 4, 2008

(51) Int. Cl.
*B32B 3/26* (2006.01)
*H01G 9/04* (2006.01)

(52) U.S. Cl. .................... 428/192; 428/220; 428/304.4; 428/319.1; 428/319.3; 428/209; 428/689; 428/698; 428/702; 361/528

(58) Field of Classification Search .................. None
See application file for complete search history.

(56) References Cited

U.S. PATENT DOCUMENTS

| | | | |
|---|---|---|---|
| 5,949,639 A | 9/1999 | Maeda et al. |
| 5,959,831 A | 9/1999 | Maeda et al. |
| 6,072,694 A | 6/2000 | Hahn et al. |
| 6,191,936 B1 | 2/2001 | Webber et al. |
| 6,391,379 B1 | 5/2002 | Lessner et al. |
| 6,451,074 B2 | 9/2002 | Bluvstein et al. |
| 7,116,548 B2 | 10/2006 | Satterfield, Jr. et al. |
| 7,154,742 B1 | 12/2006 | Hahn et al. |
| 7,190,572 B2 | 3/2007 | Maeda |
| 2005/0231895 A1 | 10/2005 | Maeda |
| 2006/0233653 A1 | 10/2006 | Trapalis |

OTHER PUBLICATIONS

Improving Thermal Shock Resistance of Surface Mount Tantalum Capacitors, D.M. Fortin, J.B. Edson, Mar. 23, 1994, R & M Library Citation.

*Primary Examiner*—Ling Xu
(74) *Attorney, Agent, or Firm*—Joseph T. Guy; Nexsen Pruet, LLC

(57) ABSTRACT

Porous sintered anode bodies for capacitors formed from valve metals are treated by electrolysis to form a dielectric layer and coated with cathode layers. When standard parallelpiped shapes are used, cathode coverage at the edges and corners is non-uniform and failures occur at those locations. Rectangular prisms, obround prisms and cylindrical prisms are formed with transition surfaces at edges and corners, such as chamfers and curves, to enhance cathode layer uniformity. The transition surface greatly enhances the application of polymer slurries.

39 Claims, 7 Drawing Sheets

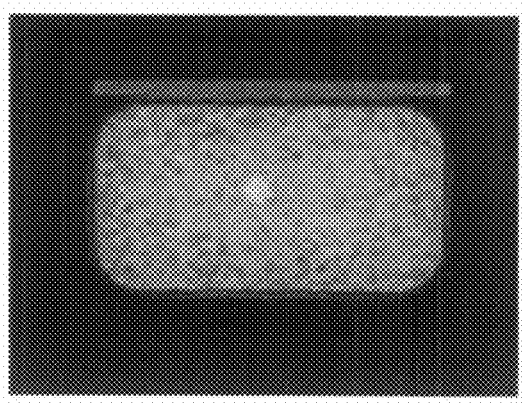
Fig.5
PRIOR ART
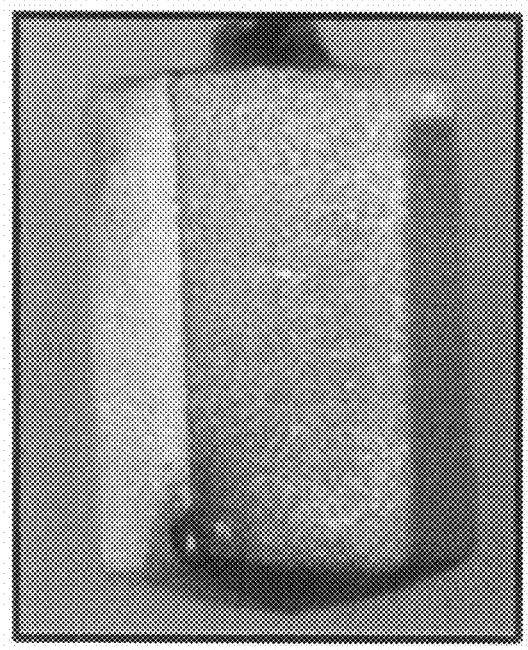 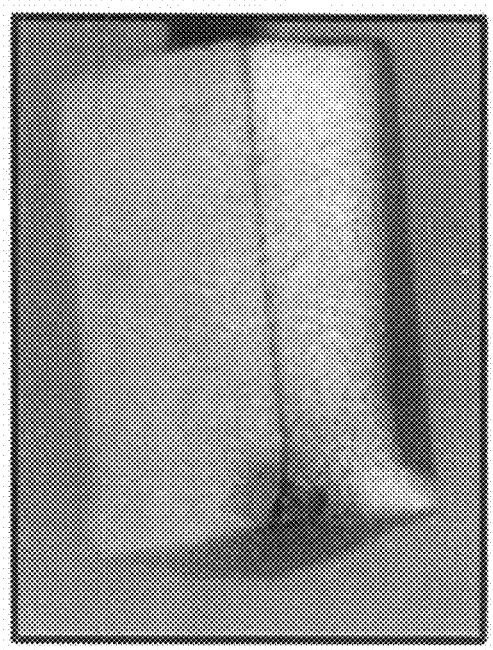
Fig.6A              Fig.6B

ANODES WITH CORNER AND EDGE MODIFIED DESIGNS

FIELD OF THE INVENTION

This invention relates to optimized geometries for anodes in solid electrolytic capacitors. More particularly, the invention relates to modifications to the geometries of capacitor anodes to facilitate coating of the total surface with a conductive polymer and avoid uncoated areas where surfaces meet.

A rectangular prism-shaped anode with rounded, chamfered, or cut out corners allows for improved coating of the corners and transition surfaces by cathode layers in an electrolytic capacitor. Edgeless rectangular, cylindrical, elliptical or obround anodes allow for improved coverage and reduced stress on the anode. More particular, the present invention allows corners or edges to be covered by cathode layers applied by dipping the anode into a liquid slurry or suspension of the cathode material followed by a drying or curing step, saving processing steps. The present invention also provides a means of reducing mechanical stress on the edges of cylindrical anodes used in hermetically sealed solid electrolytic capacitors.

BACKGROUND OF THE INVENTION

The anode of a typical solid electrolytic capacitor consists of a porous anode body with a lead wire extending beyond the anode body and connected to the positive mounting termination of the capacitor. The anode is formed by first pressing a valve metal powder into a pellet. Alternatively, the anode may be an etched foil, for example aluminum foil as is commonly used in the industry. Valve metals include Al, Ta, Nb, Ti, Zr, Hf, W, and mixtures, alloys, nitrides, or sub oxides of these metals. NbO may also be used as an equivalent to a valve metal. The pressed anode is sintered to form fused connections between the individual powder particles. All anodes are anodized to a pre-determined voltage in a liquid electrolyte to form an oxide of the valve metal which serves as the dielectric of a solid electrolytic capacitor. A primary cathode material, such as a conductive polymer or manganese dioxide, is subsequently applied via a multi-cycle liquid dipping process. In order to minimize the equivalent series resistance (ESR) of solid electrolytic capacitors the devices subsequently are dipped in a silver paint, which when dried provides a highly conductive cathode terminal coating. A carbon layer, usually applied between the primary cathode material and terminal silver layer, serves as a chemical barrier to isolate the two layers. The silvered anodes are then assembled and encapsulated to form the finished devices. The encapsulation process may be a transfer molding process or conformal coating process to manufacture surface mount capacitors. Conformal coating with a plastic sealant is often used to manufacture leaded devices. The industry standard case sizes for surface mount capacitors are rectangular solids, thus rectangular anodes or parallopipeds are used in these devices to maximize volumetric efficiency. In hermetically sealed capacitors the silvered anodes are placed in cylindrical cans containing a solder plug. Heat is applied to the can to reflow the solder. After reflow the solder secures the anode in place and forms an electrical connection between the cathode and the metallic can. The anodes used in these devices are cylindrical.

The reliability of all such devices is highly dependent on the quality of the external cathode layers.

The ability to isolate flaws in the dielectric is a requirement of the primary cathode material chosen for manufacturing solid electrolytic capacitors. This property of the primary cathode material results from a process termed 'healing'. The application of voltage to the capacitor causes current to flow through flaw sites in the dielectric, resulting in an increase in the temperature at the defect site due to Joule heating. As current flows through the flaw site the counter electrode material immediately adjacent to the flaw site is rendered nonconductive. The temperature of the cathode layer immediately adjacent to the flaw site also increases due to conduction. When manganese dioxide is employed as the cathode material, the manganese dioxide immediately adjacent to the flaw site is converted to manganese sesquioxide at the decomposition temperature of manganese dioxide (500-600° C.), thus isolating the flaw. Since the resistivity of manganese sesquioxide is several orders of magnitude greater than tha1t of manganese dioxide, leakage currents through the flaw sites decrease according to Ohm's law. A similar mechanism is postulated for conductive polymer counter electrodes. Possible mechanisms to account for the healing mechanism of conductive polymer films include complete decomposition of the polymer adjacent to the flaw site, over oxidation of the polymer, and dedoping of the polymer at the flaw site. At temperatures above 600° C. the amorphous tantalum pentoxide which serves as the dielectric in tantalum capacitors is converted to a conductive crystalline state. Thus, in order to be an effective primary cathode material for tantalum the material must convert to a nonconductive state at temperatures below 600° C. The maximum withstanding temperatures of other valve metal oxides is similar to that of tantalum.

Since the graphite and silver layers do not decompose to form nonconductive materials at temperatures below 600° C., continuous coating of all dielectric surfaces by the primary cathode material is essential to prevent the graphite or silver layers from contacting the dielectric. If the graphite or silver do contact of the dielectric the device there will be a short circuit.

Conductive polymer coatings are applied to the anode using a variety of methods as described in U.S. Pat. No. 6,072,694. The use of polymer slurries or liquid suspensions containing pre-polymerized conductive polymer as an alternative to the monomer is very attractive due to the simplicity of manufacturing, the reduction in waste, and the elimination of costly and time consuming washing steps after each coating step as directed in U.S. Pat. No. 6,391,379. Although this process approach is attractive it has not yet been implemented on a production scale. One of the principle technical obstacles to the successful implementation of a polymer slurry to serve as the primary cathode layer is the difficulty coating edges and corners of the anode with slurry. These materials tend to pull away from corners and edges due to surface energy effects. The resulting thin coverage at corner and edges results in reduced reliability of the device. The magnitude of the force pulling the liquid away from the edge is given by the Young and Laplace Equation:

$$\Delta p = \gamma / r$$

Wherein
$\Delta p$=the pressure difference causing the liquid or slurry to recede from an edge
$\gamma$=the surface tension of the liquid or slurry; and
$r$=the radius of curvature of the edge.

This effect is illustrated in FIG. 1.

During dipping the liquid phase of a suspension will enter the pores of the anode. If the particles in the suspension are larger than the pores, they will be prevented from entering the anode body and can buildup on the external surface of the anode. Thus external buildup on the faces and corners of the anode after dipping in the slurry is somewhat dependent on the void volume (i.e. density) of the anode. Variations in local density of the anode can result in non-uniform coating, especially on the corners and edges of an anode.

The reliability of a solid electrolytic capacitor is also degraded due to differences in coefficients of thermal expansion between the anode bodies and encapsulates material. These mismatches lead to thermo-mechanical stresses on the anode/dielectric during surface mounting. These stresses are greatest at the edges and corners of the anode body. Capacitor manufacturers rely on the external cathode coatings of carbon and silver paint to reduce or distribute the stress, especially at high stress points like corners and edges of the anode. However, the external cathode layers often are applied in the form of liquid slurries or suspensions which produce thin coverage at corners and edges resulting in reduced reliability of the device.

Capacitor manufacturers have also employed rectangular prism anode designs with designated rounded or chamfered edges in order to reduce the thermo-mechanical stress on edges of surface mount devices after encapsulation. An anode with chamfered edges at the top of the anode was described by D. M. Edson and J. B. Fortin in a paper published in the *Capacitor and Resistor Symposium* in March 1994 entitled "Improving Thermal Shock Resistance of Surface Mount Tantalum Capacitors." These authors used finite element analysis and failure site identification techniques to demonstrate that most failures which occurred during surface mounting were along the top edges of the anode (surface where the lead projects). A modified anode design as depicted in FIG. 2 was reported to reduce the surface mount failure rate.

An anode with a chamfered portion at the top edge of the anode (see FIG. 3) is described in U.S. Pat. No. 5,959,831 (Maeda, et al.). The purported purpose of this design is to reduce the likelihood of the primary cathode layer wicking up the anode lead wire during dipping. In U.S. Pat. No. 7,190,572 the inventor claims that excess edge buildup of manganese dioxide can be avoided by chamfering the bottom edges of the anode (see FIG. 4). The buildup of manganese dioxide at the corners is the opposite phenomenon to that observed when conductive polymers are applied. Also, some rounding of side edges of pressed anodes has been observed in capacitors on the market. (see FIG. 5).

One of the drawbacks of rounded side edges as depicted in FIG. 5 is the difficulty in pressing reproducible anodes with these geometries using a radial press design. A radial press design is defined as a press which compacts the powder in a direction perpendicular to the anode lead wire (typically the long axis of the compact). Axial presses are defined as a press which compacts the powder in a direction parallel to the anode lead wire. Although axial pressing allows for greater flexibility in anode geometries of interest to capacitor manufacturers, it often leads to other problems such as smearing of the powder at the surface as it slides inside the die cavity and density gradients in the anode in the axial direction of the anode lead. The high density regions and powder smearing make it more difficult for the liquid phase of a slurry or suspension to enter the pores of the anode, exacerbating the problems of poor cathode coverage. Although powder smearing and density gradients also occur with radial pressing, they occur to a considerably lesser degree since the longest dimension of the anode is typically along the length of the anode lead wire.

Although rounded and chamfered edge rectangular anodes have been described and utilized in the industry for years, the concept of corner chamfering has not been explored. In fact, since the edges represent a line drawn between two points, the corners, corner rounding would not be expected to provide benefits beyond that of edge rounding. However, analysis of many electrically failed conductive polymer anodes indicates that the dielectric breakdown mainly occurs on the corners of the anodes, as shown in FIG. 6.

Another approach to improving corner coverage would be to eliminate the corners through the use of cylindrical or obround anode geometries. However cylindrical anodes are volumetrically inefficient when used in industry standard case dimensions for surface mount product. Obround anodes are more volumetric efficient, but pressing these anodes is generally done on an axial style press. This leads to density gradients and high densities at either the top or bottom edge of the anode. These high density edges are as difficult to fully coat with a slurry as a corner on a rectangular shaped anode.

Axial leaded hermetically sealed solid electrolytic capacitors are extremely reliable capacitors. Because the only heat introduced in the solder attach process is to the leads, on the opposite side of the printed circuit board (PCB) as the part, the temperature rise is small, and damaging forces (mismatch in coefficients of thermal expansion) created by this process are minimal. Compared to the forces created in the solder process for surface mount capacitors (SMT) where the entire capacitor package is immersed into the high thermal profile of the solder, theses forces should never create failures. This fact is born out in the recommended applications of these capacitors. Leaded capacitors may be used up to 80% of its nameplate voltage, whereas the product is limited to 50% of its nameplate voltage.

The big disadvantage for these leaded products is the susceptibility to mechanical forces created in handling of the parts. As loose pieces are handled, there is a potential of dropping the device, crimping the device, or pressing on the device in the process of moving from package to place in circuit that is not detectable. If the piece survives the initial electrical testing, the flaw created by the physical force can grow and become a circuit failure at a later point.

Through diligent research the present inventors have found that polymer coverage and leakage are improved by various techniques of modifying the corners of anodes to improve the corner coverage with the primary cathode material. Problems of poor edge coverage on obround or cylindrical anodes can be overcome by modifying the edges of these anode designs. The reliability of hermetically sealed devices can be improved by similarly modifying the edges of cylindrical anodes used in this style capacitor.

SUMMARY OF THE INVENTION

It is an object of the present invention to provide anode designs which facilitate corner and edge coverage by the cathode layers, especially the primary cathode layer.

It is another object of this invention to provide anode designs with modified corner geometries which are readily pressed using conventional radial presses.

Another object of this invention is to achieve corner rounding with minimal loss of anode volume.

It is yet another object of this invention to provide anode designs suitable for use with conductive polymer slurries.

Yet another object of this invention is to provide anode designs with improved leakage characteristics relative to conventional anodes.

These and other advantages are provided in anodes with modified edge and corner geometries through the use of transition surfaces such as rounded or chamfered corners and edges and by an anode with a groove cut in each corner of the anode.

Yet another embodiment of the present invention is provided by a cylindrical or obround anode with grooves cut along either the top or bottom edge, by an edgeless rectangular anode, by an edgeless obround anode, and by an edgeless cylindrical anode.

DESCRIPTION OF DRAWINGS

FIG. 5 is a cross sectional view of prior art rounded side anode.

FIG. 6A and FIG. 6B indicate the failure site location of anodes following a breakdown voltage test.

DETAILED DESCRIPTION OF THE INVENTION

A porous pellet is prepared by pressing a powder and sintering to form a porous body. The pellets may be made from any suitable material such as tantalum, aluminum, niobium, hafnium, zirconium, titanium, or alloys of these elements, nitrides and suboxides. Tantalum and ceramic niobium oxide are the preferred materials. Tantalum is the most preferred material. The sintered pellet is then anodized to form the oxide film which serves as the dielectric of the capacitor. The internal surfaces of the anodic oxide film are next coated with a primary cathode layer. Manganese dioxide may be applied as a primary cathode layer by dipping in manganous nitrate solution and converting the nitrate to manganese dioxide via heating in a pyrolysis oven. Typically the conversion step is carried out between 250° and 300° C. Alternatively, an intrinsically conductive polymer can be employed as the primary cathode layer. The conductive polymer material is typically applied as a monomer using either a chemical oxidative process or by dipping in a preformed polymer slurry. In the case of a chemical oxidative process, byproducts of the reaction are removed by washing and typically multiple dips and washings are required prior to a reanodization process used to isolate the defect sites in the dielectric. The pellets are then placed in suitable electrolyte bath, for instance a dilute aqueous phosphoric acid solution with a conductivity in the range 50 to 4000 micoS/cm. Voltage is applied to drive the process which causes isolation of the dielectric flaw sites This process may not be required in the case of application of the conductive material by dipping the anodes in a preformed (prepolymerized) polymer slurry. The process is repeated to insure complete coverage of the internal and external dielectric surfaces. The components are subsequently dipped in a carbon suspension to coat the external surfaces of the primary cathode material. A silver layer is formed by dipping the device in a silver paint to form an external coating.

Figure 1:
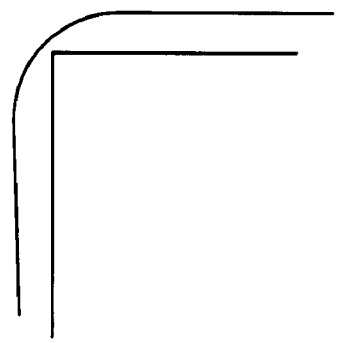
FIG. 1 is an illustration of a liquid receding from an edge due to surface tension effects.
Figure 2:
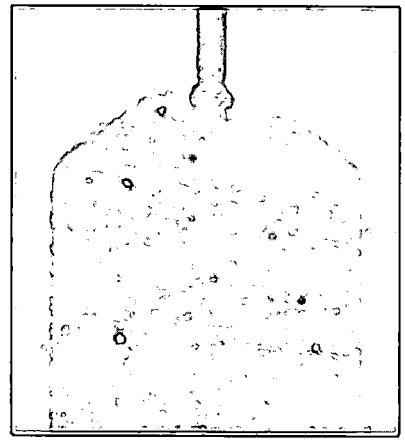
FIG. 2 is a depiction of prior art top edge chamfered anode.
Figure 3:
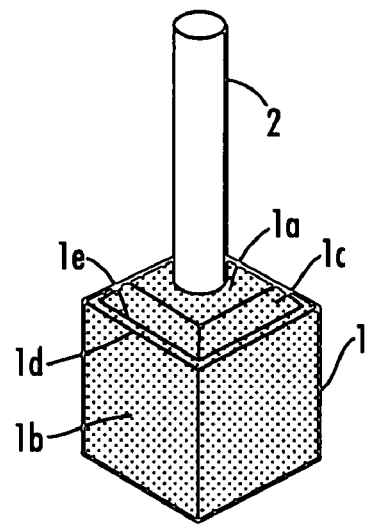
FIG. 3 is a depiction of prior art top edge chamfered anode.
Figure 4:
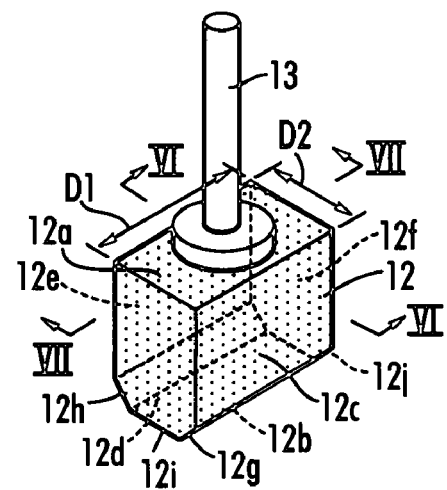
FIG. 4 is a depiction of prior art bottom edge chamfered anode.

FIG. 1 depicts the manner in which a liquid or slurry pulls away from an edge or corner due to surface tension effects. FIG. 2 depicts prior art in which the top edges of a surface mount capacitor were chamfered to reduce stress on those edges. FIG. 3 is a depiction of an anode with chamfered top edges as described in U.S. Pat. No. 5,959,831 (Maeda, et al.). FIG. 4 depicts chamfering of bottom edges as depicted in US 2005/0231895 A1. FIG. 5 is a picture of a commercial capacitor which has been cross sectioned to reveal rounded edges. FIG. 6 is a picture of capacitors following a breakdown test indicating the failures occurred on the corners of the anode. In a breakdown voltage test, a power supply, resistor, fuse, and capacitor are placed in series. The voltage applied to the capacitor is increased until the capacitor breaks down as indicated by the blown fuse. Especially in the case of capacitors with polymer slurry cathode the failure site occurs predominantly on the corners of the anode which are poorly coated by the polymer slurry.

Figure 13:
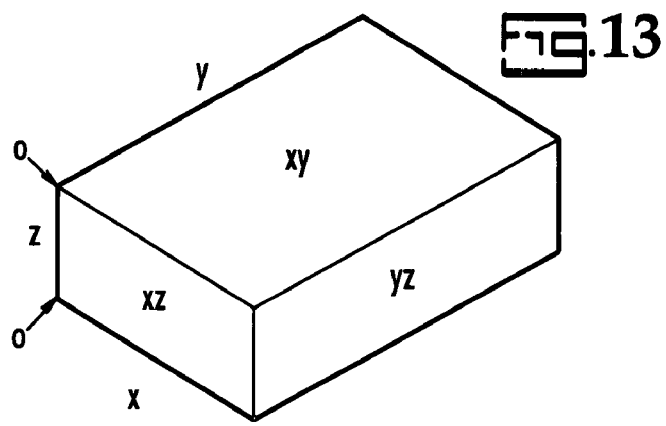
FIG. 13 depicts a rectangular prism for illustration of surfaces, edges and corners.

For purposes of understanding the invention, reference is made to FIG. 13. FIG. 13 shows a rectangular prism or a parallelopiped. The X, Y, and Z axes are defined with respect to origin "O." The exposed surfaces are labeled XY, XZ, and YZ. An edge is defined as the intersection of two surfaces. A corner (or point) is defined as the intersection of three surfaces or three edges.

Figure 14:
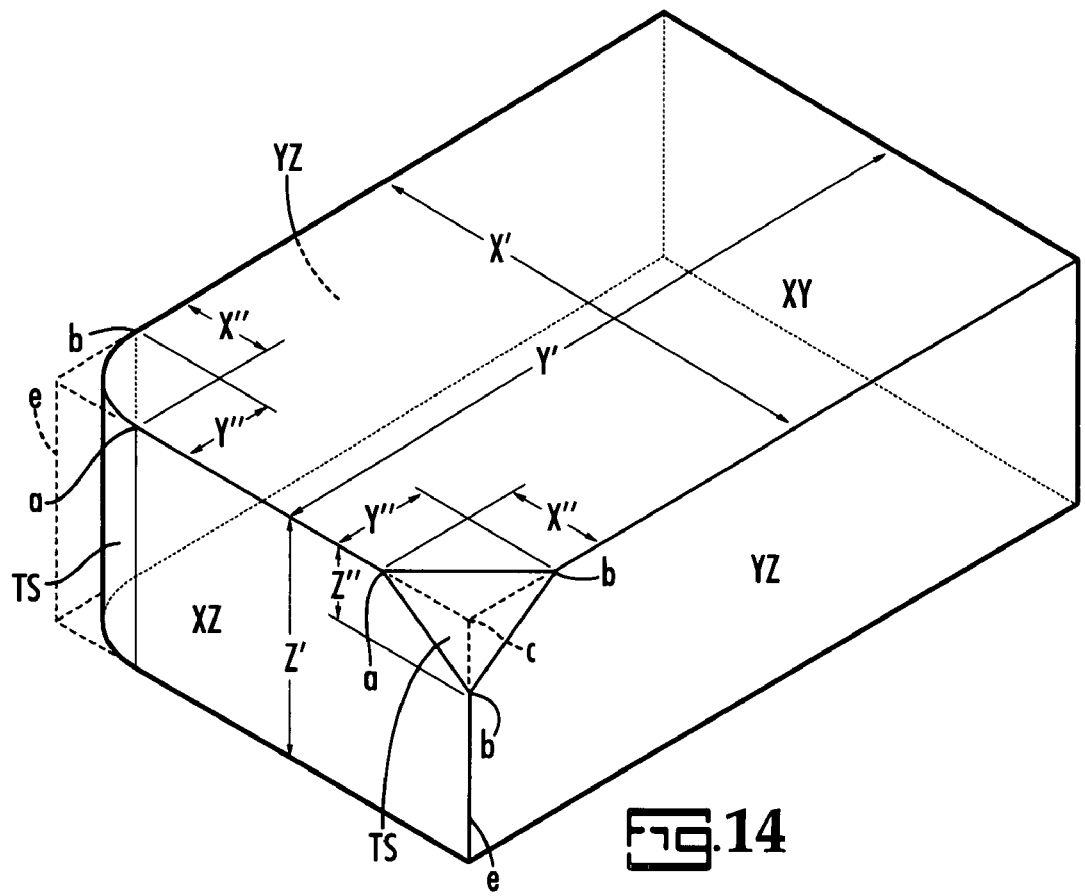
FIG. 14 depicts a rectangular prism in perspective view.

Modification of an edge can be defined by reference to FIG. 14. FIG. 14 represents an anode in perspective view. A surface XZ with a length X' and width Z' represents a first external surface of an anode. A surface YZ with a length Y' and width Z' represents a second external surface of an anode. For conventional anodes XZ and YZ meet to form a right angle at an edge. In an edge modified design the first surface XZ will deviate at point a and distance X" from the edge, e, which is the projected intersection of XZ and YZ. The second surface of the anode will deviate from YZ at point b and distance Y" from e. This deviation creates at least one additional surface, herein defined as a transition surface, TS. In one embodiment the deviation is a straight diagonal line between points a and b wherein the transition surface creates a chamfer. In another embodiment the transition surface is a non-linear, curved, or radiused edge. Edge modified designs as defined here refers to any deviation of the external surface from XZ and YZ such that:

$$0.03 \text{ mm} < X'' < 0.5X'$$

and $$0.03 \text{ mm} < Y'' < 0.5Y'.$$

The concept can be extended to a third dimension of a conventional rectangular prism. A corner, c, is defined by the projected intersection of three surfaces YZ, XZ and XY. The surface XZ with a length X' and width Z' representing an external surface of an anode. In a corner modified design the surface XZ will also deviate at point d and distance Z" from c. A corner modified design as defined herein refers to any deviation of the external surfaces such that:

$0.03\ mm<X''<0.5X'$ and $0.03\ mm<Y''<0.5Y'$ and $0.03\ mm<Z''<0.5Z'$.

In a conventional SMT the anode shape is a regular rectangular prism as illustrated in FIG. 13. The surfaces all intersect at right angles (or approximations thereof), providing six surfaces and twelve edges.

According to this invention, most or all of the edges are modified to form transition surfaces. The transitions may be flat as in a traditional chamfer or bevel. Alternately, the transition may form multiple chamfers including, in the limit, a curved surface such as would be obtained using a corner round router bit.

When rounded edges intersect, a quarter of a hemisphere is formed which maybe regular, as when all radii of generation are equal or compound when the radii of the generating curves differ.

Referring again to FIG. 14, it is apparent that the size of a straight bevel or chamfer can be defined in terms of X", Y", and/or Z". Since there are twelve edges and eight corners formed by six surfaces, a great variety of shapes can be formed when the lengths X, Y and Z differ from each other or when different edges are chamfered or when only corners are chamfered. Depending upon the size of the anode-case size-different transition surface shapes and sizes are found to be preferred.

Figure 7:
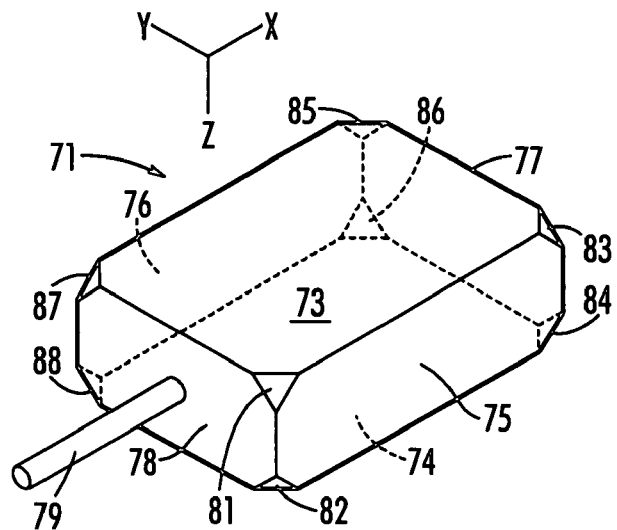
FIG. 7. is a depiction of a corner chamfer anode design.

As a first example of a body having a transition surface, reference is made to FIG. 7. Anode body 71, having six planar sides 73, 74, 75, 76, 77, and 78 and an anode lead 79 has been chamfered at each corner to provide transitional planar surfaces 81, 82, 83, 84, 85, 86, 87, and 88. This shape directly addresses the problem with corner coating as illustrated in FIG. 6A and FIG. 6B. This is a corner chamfer anode.

Figure 8:
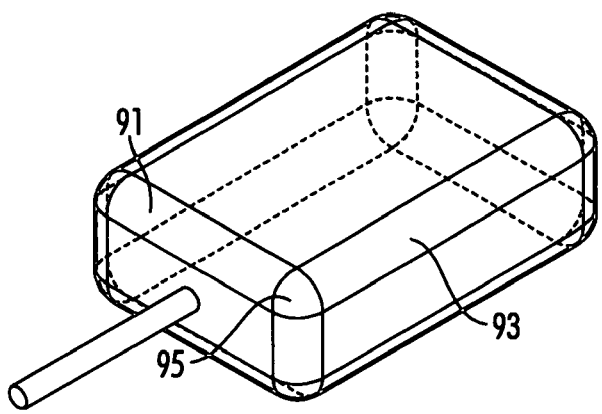
FIG. 8 is a depiction of an edgeless rectangular anode.

When edges and corners are all curved, the result is an edgeless shape as shown in FIG. 8. Three transitional surfaces are present, a short side curved transitioned surface 91, a long side curved transitional surface 93 and a corner quarter hemisphere 95. In the preferred embodiment, all radii of generation are equal but such is not necessary. For small case sizes a greater radius in the Z direction may be preferred.

Figure 9:
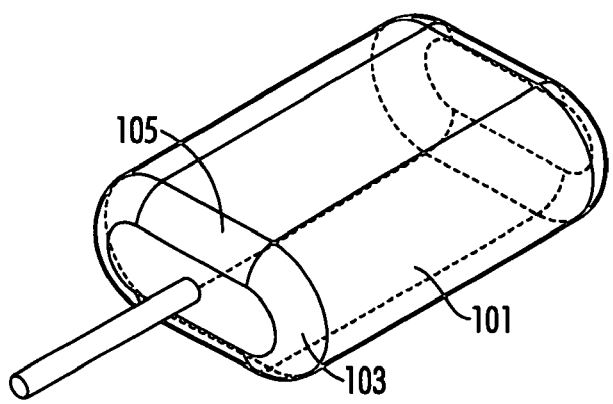
FIG. 9 is a depiction of an edgeless obround anode.

When the curvature at the edges in the YZ surface is expanded to become a continuous curve, the resultant figure is an obround prism as shown in FIG. 9. The YZ surface has been replaced with a curved surface, such as semicircular in cross-section. In the preferred embodiment, the transition surfaces form the XY surface and from the semicircular side are radiused into the XZ surface (cf. 103) and the transition surface from the XY surface (cf. 105) are radiused into the XZ surface. Such an anode has no sharp edges save for some flashing at the points of juncture of the dice employed. The XY surface of an oblong prism may be flat or curved.

Figure 10:
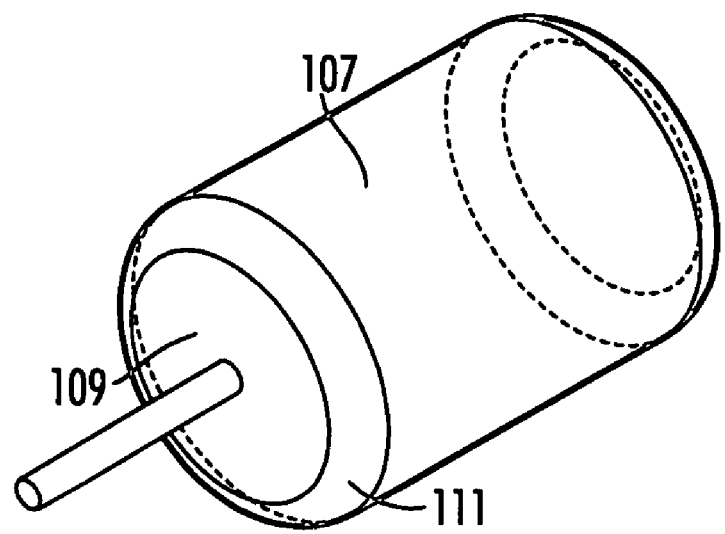
FIG. 10 is a depiction of an edgeless cylindrical anode.

Extrapolation of the edgeless obround shape of FIG. 9 is the edgeless cylinder of FIG. 10. A cylindrical anode has traditional round sides 107, but the transition surface 111 to the flat top 109 (and bottom, not shown) is chamfered or, in the drawing, rounded or curved to make a smooth transition from side to top.

When the basic prism shape is obround, the edges and corners may have consistent or changing radii, but the chord for the curve is defined using the same criteria as for a chamfered surface. When the figure is a cylinder, the radius of the circle of origin becomes one length, and the height of the cylinder becomes the other length, i.e., the intersection of planar surface and circumferential surface is characterized as $0.03\ mm<R<r$ and $0.03\ mm<H<h/2$ where r and h are the radius of the circle of origination and H the height of the cylinder.

The edgeless cylinder has particular application in hermetically sealed leaded devices.

Figure 11:
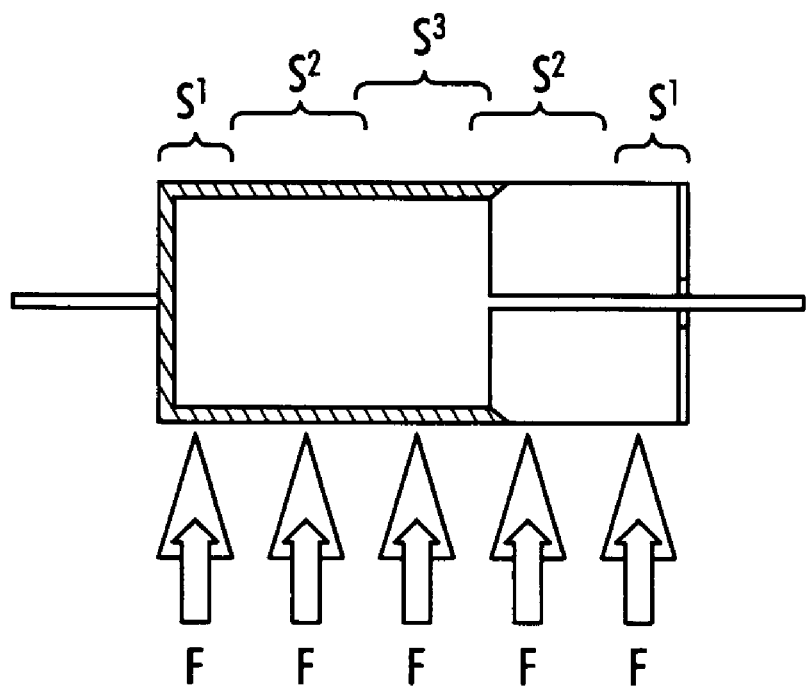
FIG. 11 depicts the mechanical forces acting on a hermetically sealed device.

Failure site analysis reveals that the vast majority of failures, up to 95%, will appear on the edges of the cylindrical anode. These edges are most susceptible to any outside forces applied to the case wall (FIG. 11). In between these edges, the pellet structure offers a strong resistive structure that will spread the force and absorb it. In between the edge and the sealed, top of the case, the case can compress to absorb the force. At the edges, the forces can create a fracturing force on the pellet. The relative stresses are in the order $S^1$, $<S^2$, $<S^3$. The top edge (nearest the anode seal) is more susceptible than the bottom edge (nearest the cathode lead) as the closed end of the barrel adds stiffness here.

Figure 12:
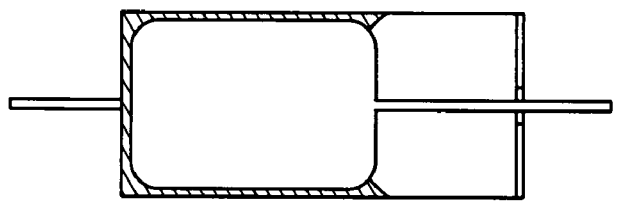
FIG. 12 depicts edge rounding of cylindrical anode in hermetically sealed construction.

In order to mitigate this failure mechanism the edges of the pellet can be rounded. By eliminating the sharp edge (FIG. 12), the amount of force required to fracture or chip the pellet increases tremendously. Once the pellet is soldered in the case, the sharp edges would have been eliminated and replaced with a tapering solder thickness. The radiused or rounded elements nearest the outer diameter have capabilities of spreading blunt forces through the case. The radiused elements furthest from the outer diameter have thicker solder which creates additional buffering.

Figure 15:
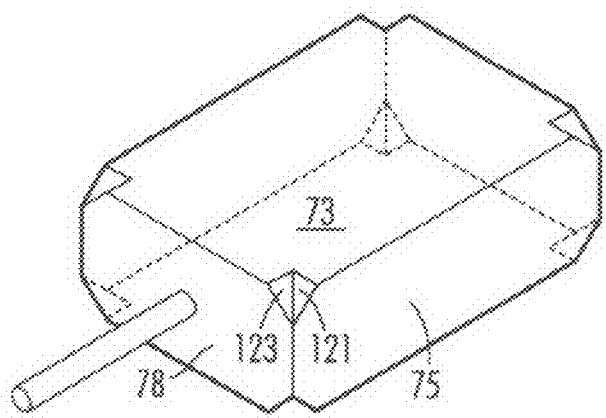
FIG. 15 is a depiction of a corner cut anode design

It has been found that a second approach to enhancing coverage is surprisingly effective. An anode having cut-away portions at the corners—hereinafter a corner cut anode—is effective in collecting conductive polymer at the corners during the coating process. FIG. 15 shows a preferred corner cut anode sintered body. At the juncture of three surfaces 73, 75 and 78, two cuts are made to create two additional transitional surfaces, 121 and 123. This pattern is repeated at the other seven corners to form "pockets." The improvement may be seen in FIG. 16 when contrasted with FIG. 6 and FIG. 17. While not being bound by any theory, it is seemed that monomer, and subsequently polymer, accumulates on the surfaces of the transition surface 121, 123 and compensates for the thin or incomplete layers found in standard rectangular parallelepiped shape for anodes. The corner cut anode seems particularly suitable for dipping in polymer slurries.

Polymer slurries of intrinsically conductive polymers are an alternative coating methodology to the formation of polymer from a monomer and catalyst on the surface of the oxidized pellet. Slurries may be applied using a cross-linking agent as disclosed in U.S. Pat. No. 6,451,074. The use of slurries reduces the number of coating steps when making the capacitor and reduces the loss of monomer due to contamination. U.S. Published Application No. 2006/02336531 discloses polythiophene particles with filler as a coating material of conductive polymer. Any intrinsically conductive polymer may be used. Polyaniline is preferred due to ease of handling. Coating thickness should be at least 0.25 micrometers, preferably at least 1 micrometer and optimally at least 3 micrometers to obtain complete coverage of all edges. The use of anode pellets with transition surfaces at the end and/or sides away from the anode lead allows reliable mechanical dipping into the slurry with minimal deposition of polymer on the anode lead. The capacitor precursor then may be coated with graphite and Ag, a cathode lead attached and final assembly performed.

A fluted anode is one which has surfaces which are not substantially flat. The variations in the surface may be, but are not necessarily symmetrical or repeated in a pattern. Examples of fluted anodes may be found in U.S. Pat. Nos. 7,154,742; 7,116,548; 6,191,936; and, 5,949,639. The capacitors disclosed in these references are pressed to have substantially flat ends where anode lead projects and at the opposite end. Most have flat sides except for the penetrations into the body of the anode. Multiple sharp edges are present and present challenges when coatings are applied.

Modifications of the external surfaces to remove sharp angles results in improved coating. The edges and/or corners may be chamfered or curved in the manner of FIGS. 7 and 8 to achieve a more uniform coating of the polymer. Triangular corners as shown in FIG. 7 and notched corners such as shown in FIG. 15 are also preferred. Internal surfaces, meaning those wholly within the interstices of the flutes need not be modified. In preferred embodiments, multiple flat wires are used as anode leads.

EXAMPLE 1

Figure 16:
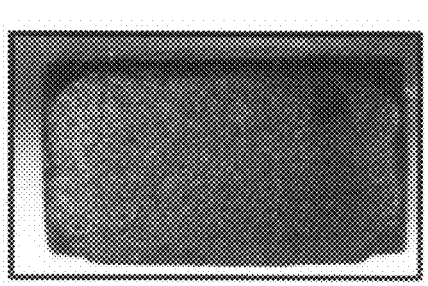
FIG. 16 depicts polymer coverage of corner cut anodes
Figure 17:
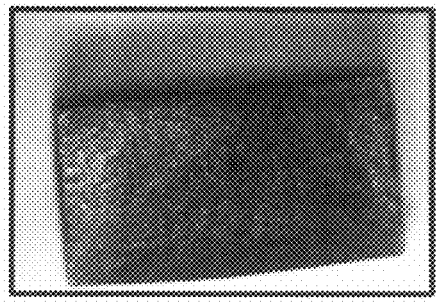
FIG. 17 depicts polymer coverage of conventional anode with dielectric show through evident at corners due to incomplete polymer coverage.

Commercial electronic grade 22,000 CV/g tantalum powder was pressed to form anodes to a density of 5.5 g/cc with dimensions 4.70×3.25×1.68 mm using a radial action press. The punches of the press were modified to create a notch or v-cut in each corner of the anode as depicted in FIG. 15. This modification to the corners is referred to as corner cut anode designs. The sintered anodes were anodized at 100 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the corners of the anodes (FIG. 16). After application of a conductive polymer slurry the parts were dipped in a carbon suspension used for commercial tantalum conductive polymer capacitors. The anodes were dipped in an electronics grade silver paint prior to assembly and encapsulation to form surface mount tantalum capacitors. After encapsulation 25 volts was applied to the capacitors and leakage was read through a 1 k ohm resistor after allowing 60 seconds for the capacitors to charge. The results were plotted in FIG. 17.

COMPARATIVE EXAMPLE 1

Figure 18:
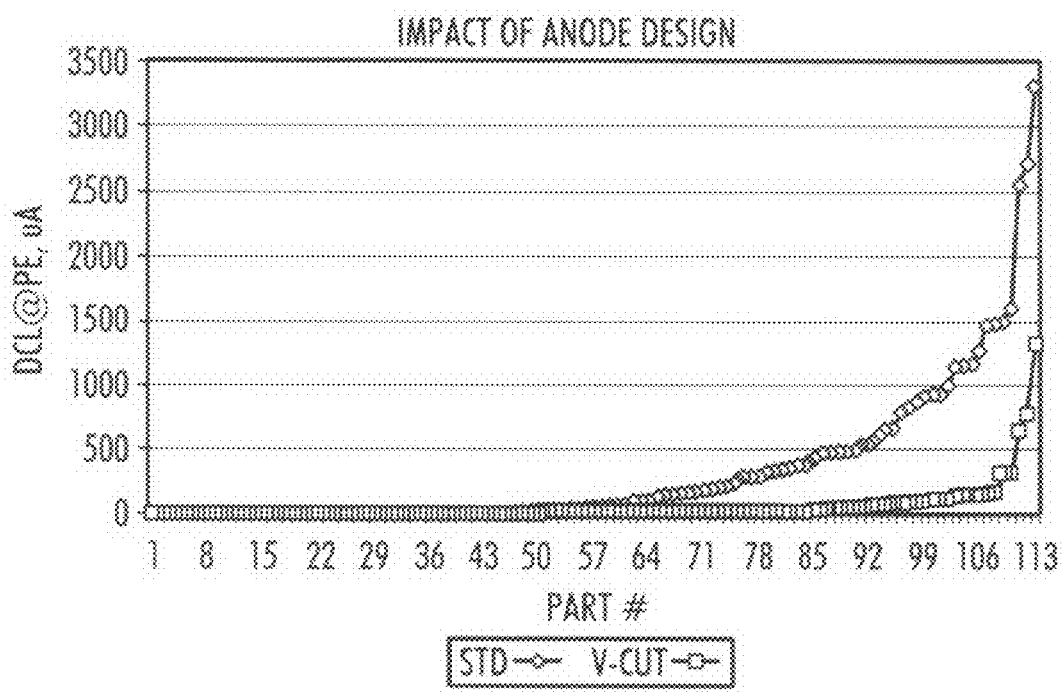
FIG. 18 plots leakage for standard and corner cut anodes

Commercial electronic grade 13,000 CV/g tantalum powder was pressed to a density of 5.5 g/cc with dimensions 4.70×3.25×1.70 mm using a radial action press. Conventional punches were used which created well defined corners typical of anodes used in the industry. The sintered anodes were anodized to 130 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the corners of the anodes (FIG. 18). After application of the conductive polymer slurry the parts were dipped in a carbon suspension used for commercial tantalum conductive polymer capacitors. The anodes were dipped in an electronics grade silver paint prior to assembly and encapsulation to form surface mount tantalum capacitors. After encapsulation 25 volts was applied to the capacitors and leakage was read through a 1 k ohm resistor after allowing 60 seconds for the capacitors to charge. The results and comparison were plotted in FIG. 18 wherein DCL is direct current leakage and PE is post-encapsulation. A comparison of the polymer coverage and leakage distributions after encapsulation demonstrates the improvements obtained with the corner cut anode design relative to prior art.

EXAMPLE 2

Figure 19:
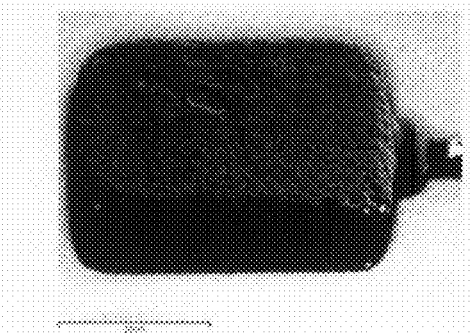
FIG. 19 depicts polymer coverage on anodes with rounded corners.

Commercial electronic grade 13,000 CV/g tantalum powder was pressed to a density of 5.5 g/cc with dimensions 4.57×3.10×1.63 mm using a pill style press. The lead wire is attached after pressing with this type of press. The action of this style press generates anodes with rounded corners on one side of the anode. The corners on the opposite side of the anode are sharp, well defined corners. The sintered anodes were anodized to 130 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the rounded corners of the anodes (FIG. 18). Photomicrographs taken of the opposite side of the anode demonstrates the poor polymer coverage on the sharp well defined corners of the anode (FIG. 19). These pictures clearly indicate the need to modify the corners of the anodes in order to obtain sufficient coverage using slurries or suspensions to apply cathode layers.

COMPARATIVE EXAMPLE 2

Figure 20:
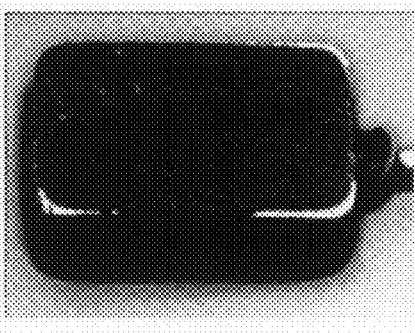
FIG. 20 depicts polymer coverage on anodes with conventional corners
Figure 21:
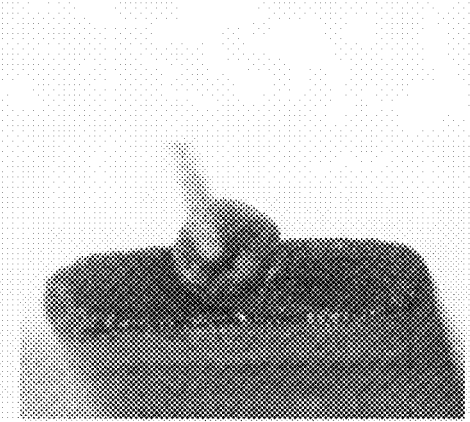
FIG. 21 depicts polymer coverage at the top of an obround anode pressed on an axial press.
Figure 22:
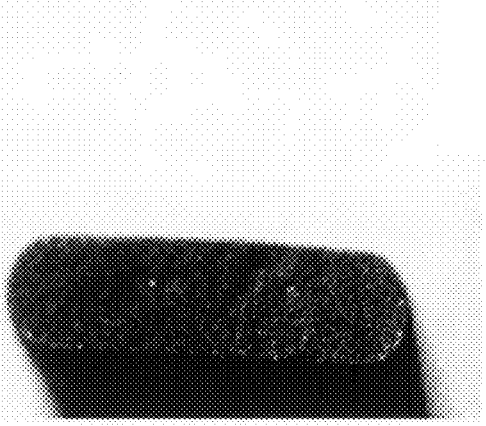
FIG. 22 depicts polymer coverage at the bottom of an obround anode pressed on an axial press.

In order to eliminate the corners completely an axial press was used to press obround anodes. Commercial electronic grade 22,000 CV/g tantalum powder was pressed to an average density of 5.5 g/cc with dimensions 4.70×3.25×0.81 mm. An obround shaped die was used to press an anode without corners. The sintered anodes were anodized to 100 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the anodes. Polymer coverage at the top of the anode, where the density was less than 5.5 was acceptable (FIG. 20). However, at the bottom of the anode where the press density was greater than 5.5 the edges of the anode were not covered with polymer (FIG. 21). The density gradient observed in these anodes is characteristic of anodes produced on an axial press.

The invention has been disclosed in regard to preferred examples and embodiments which do not limit the scope of the invention disclosed. Modifications apparent to those with skill in the art are subsumed within the scope and spirit of the invention.

INDUSTRIAL UTILITY

The disclosed invention improves quality and durability of capacitors in electronic devices.

We claim:

1. A porous anode body comprising a sintered anode in a form of a rectangular prism wherein at more than 5 intersections with each intersection of said interections being of at least two surfaces, said two surfaces meet at transition surfaces wherein a transition surface at the intersection of two surfaces defined as XZ and YZ is defined by:

$$0.03 \text{ mm} < X'' < 0.5\, X'$$

and $$0.03 \text{ mm} < Y'' < 0.5\, Y'$$

wherein X' represent a length and Z' represents a width of surface XZ; wherein Y' represent a length and Z' represents a width of surface YZ; XZ will deviate a distance X" from a projected intersection of XZ and YZ, YZ will deviate a distance Y" from said projected intersection.

2. The porous anode body according to claim 1 wherein the transition surfaces are substantially chamfers.

3. The porous anode body according to claim 1 wherein the transition surfaces are substantially curves.

4. The porous anode body according to claim 1 wherein said anode is selected from the group consisting of Al, Ta, Ti, Nb, Zn, Hf, W, mixtures, alloys, nitrides and suboxides thereof and NbO.

5. The porous anode body according to claim 1 wherein a transition surface at an intersection of three surfaces defined as XZ, XY and YZ is defined by:

$$0.03 \text{ mm} < X'' < 0.5\, X'$$

$$0.03 \text{ mm} < Y'' < 0.5\, Y'$$

and $$0.03 \text{ mm} < Z'' < 0.5\, Z'$$

wherein X' represent a length and Y' represents a width of surface XY;
wherein XY will deviate a distance X" from a projected intersection of XY, YZ and XZ at the intersection of XY and XZ;
YZ will deviate a distance Y" from a projected intersection of XY, YZ and XZ at an intersection of XY and YZ; and
XZ will deviate a distance Z" from a projected intersection of XY, YZ and XZ at an intersection of XZ and YZ.

6. The porous anode body according to claim 1 wherein all intersections of at least two surfaces are changed to create transition surfaces.

7. The porous anode body according to claim 6 wherein said anode is selected from the group consisting of Al, Ta, Ti, Nb, Zn, Hf, W, mixtures, alloys, nitrides and suboxides thereof and NbO.

8. The porous anode body of claim 1 further comprising a dielectric on said sintered anode and a conductive polymer on said dielectric.

9. The porous anode body of claim 1 wherein said rectangular prism further comprises at least one flute.

10. The porous anode body comprising a sintered anode in a form of a rectangular prism wherein at more than 3 intersections with each intersection of said intersections being of 3 surfaces said intersections are changed to create transition surfaces wherein a transition surface at an intersection of three surfaces defined as XZ, XY and YZ is defined by:

$$0.03 \text{ mm} < X'' < 0.5\, X'$$

$$0.03 \text{ mm} < Y'' < 0.5\, Y'$$

and $$0.03 \text{ mm} < Z'' < 0.5\, Z'$$

wherein X' represent a length and Z' represents a width of surface XZ;
wherein Y' represent a length and Z' represents a width of surface YZ;
wherein X' represent a length and Y' represents a width of surface XY;
wherein XY will deviate a distance X" from a projected intersection of XY, YZ and XZ at an intersection of XY and XZ;
YZ will deviate a distance Y" from a projected intersection of XY, YZ and XZ at an intersection of XY and YZ; and
XZ will deviate a distance Z" from a projected intersection of XY, YZ and XZ at an intersection of XZ and YZ.

11. The porous anode body according to claim 10 wherein the transition surfaces are substantially chamfers.

12. The porous anode body according to claim 10 wherein the transition surfaces are substantially curves.

13. The porous anode body according to claim 10 further comprising an anode lead projecting from a surface opposite to a surface intersecting 4 transition surfaces.

14. The porous anode body according to claim 10 wherein said anode is selected from the group consisting of Al, Ta, Ti, Zn, Nb, Hf, W, mixtures, alloys, nitrides and suboxides thereof and NbO.

15. The porous anode body of claim 10 further comprising a dielectric on said sintered anode and a conductive polymer on said dielectric.

16. The porous anode body of claim 10 wherein said rectangular prism further comprises at least one flute.

17. The porous anode body comprising a sintered anode in a form of a rectangular prism wherein at all intersections of two surfaces, said intersections are changed to create transition surfaces wherein a transition surface at an intersection of two surfaces defined as XZ and YZ is defined by:

$$0.03 \text{ mm} < X'' < 0.5\, X''$$

and $$0.03 \text{ mm} < Y'' < 0.5\, Y'$$

wherein X' represent a length and Z' represents a width of surface XZ; wherein Y' represent a length and Z' represents a width of surface YZ; XZ will deviate a distance X" from a projected intersection of XZ and YZ, YZ will deviate a distance Y" from said projected intersection.

18. The porous anode body according to claim 17 wherein the transition surfaces are substantially chamfers.

19. The porous anode body according to claim 17 wherein the transition surfaces are substantially curves.

20. The porous anode body according to claim 17 wherein said anode is selected from the group consisting of Al, Ta, Ti, Zn, Nb, Hf, W, mixtures, alloys, nitrides and suboxides thereof and NbO.

21. The porous anode body of claim 17 further comprising a dielectric on said sintered anode and a conductive polymer on said dielectric.

22. The porous anode body of claim 17 wherein said rectangular prism further comprises at least one flute.

23. The porous anode body comprising a sintered anode in a form of an obround prism wherein at least one edge has been changed to create a transition surface wherein the transition surface at an intersection of two surfaces defined as XZ and YZ is defined by:

$$0.03 \text{ mm} < X'' < 0.5\, X'$$

and $$0.03 \text{ mm} < Y'' < 0.5\, Y'$$

wherein X' represent a length and Z' represents a width of surface XZ; wherein Y' represent a length and Z' represents a width of surface YZ; XZ will deviate a distance X" from a projected intersection of XZ and YZ, YZ will deviate a distance Y' from said projected intersection.

24. The porous anode body according to claim 23 wherein the transition surface is substantially a chamfer.

25. The porous sintered body according to claim 23 wherein the transition surface is substantially a curve.

26. The porous anode body according to claim 23 wherein said anode is selected from the group consisting of Al, Ta, Ti, Zn, Nb, Hf, W, mixtures, alloys, nitrides and suboxides thereof and NbO.

27. The porous anode body according to claim 23 further comprising an anode lead projecting from a surface opposite to a surface intersecting at least one transition surface.

28. The porous anode body according to claim 23 wherein the intersection of all surfaces have been modified to create a transition surface.

29. The porous anode body according to claim 28 wherein said anode is selected from the group consisting of Al, Ta, Ti, Zn, Nb, Hf, W, mixtures, alloys, nitrides and suboxides thereof and NbO.

30. The porous anode body of claim 23 further comprising a dielectric on said sintered anode and a conductive polymer on said dielectric.

31. The porous anode body of claim 23 wherein said obround prism further comprises at least one flute.

32. The porous anode body comprising a sintered anode in the form of a cylindrical prism wherein an edge of at least one flat surface has been changed to create a transition surface meeting a requirement that 0.03 mm <R<r and 0.03 mm <H<h/2 wherein r and h are a radius and height of the cylindrical prism, respectively and R and H are distances cut back from an intersecting lines along r and h.

33. The porous anode body according to claim 32 wherein the transition surface is substantially a chamfer.

34. The porous anode body according to claim 32 wherein the transition surface is substantially curved.

35. The porous anode body according to claim 32 wherein said anode is selected from the group consisting of Al, Ta, Ti, Zn, Nb, Hf, W, mixtures, alloys, nitrides and suboxides thereof and NbO.

36. The porous anode body according to claim 32 wherein edges of both flat surfaces have been modified to create transition surfaces.

37. The porous anode body according to claim 36 wherein said anode is selected from the group consisting of Al, Ta, Ti, Zn, Nb, Hf, W, mixtures, alloys, nitrides and suboxides thereof and NbO.

38. The porous anode body of claim 32 further comprising a dielectric on said sintered anode and a conductive polymer on said dielectric.

39. The porous anode body of claim 32 wherein said cylindrical prism further comprises at least one flute.

* * * * *